United States Patent Office 3,460,922
Patented Aug. 12, 1969

3,460,922
METHOD OF PRODUCING GELLED HYDROCARBONS EMPLOYING POLYURETHANES
Joseph Winkler, Hazleton, Pa., assignor, by mesne assignments, to Tenneco Chemicals, Inc., a corporation of Delaware
No Drawing. Continuation-in-part of applications Ser. No. 544,416 and Ser. No. 544,418, Apr. 22, 1966. This application Jan. 9, 1967, Ser. No. 607,900
Int. Cl. C10l 7/02
U.S. Cl. 44—7    16 Claims

ABSTRACT OF THE DISCLOSURE

This disclosure describes a method of increasing the viscosity of liquid hydrocarbons, especially hydrocarbon fuels, by the in situ formation of cross-linked polyurethane polymers in liquid hydrocarbons by reaction between a hydroxyl terminated semipolymer which is soluble in the hydrocarbon, a semipolymer having a molecular weight of 1,000 and a polyisocyanate.

---

This application is a continuation-in-part application of copending applications Ser. Nos. 544,416 and 544,418, both filed on Apr. 22, 1966 and both now abandoned.

This invention is concerned with thixotropic-gelled, inflammable hydrocarbon compositions and processes for their preparation. More particularly it is concerned with inflammable compositions comprising hydrocarbon mixtures gelled by the presence of a high molecular weight polymer.

Hydrocarbon fuels such as gasoline, kerosene, diesel fuel and the like are widely employed as power sources. They are, as a class, highly inflammable and may burn with explosive violence under a wide variety of conditions. Although there are problems in the safe use of hydrocarbon fuels in any situation where they are employed, the problems are particularly acute in military and commercial aviation especially with jet and turbo-jet engines. One of the greatest dangers associated with the use of jet and turbojet engines is the danger that the hydrocarbon employed as a fuel has a low viscosity and therefore may leak and cause dangerous fires, or in the case of a crash may be spilled over a wide area and cause explosive fires in the area of the crash. It has therefore long been a problem in the art to devise means of increasing the viscosity of hydrocarbon fuels without decreasing their fuel efficiency. Such advances as have been made in the preparation of viscous fuels have been limited to the use of various metallic soaps to increase viscosity. These compositions, however, have not been satisfactory since they produce metallic ash when burned in an engine.

The process of this invention alleviates the abovementioned problems and others by making it possible to safely prepare inflammable hydrocarbon compositions of any desired viscosity which can be utilized as power sources in substantially any application where limited hydrocarbons have heretofore been utilized.

Thixotropic gelled hydrocarbons have important uses not only in jet fuels and liquid rockets, but also in military applications such as in flame throwers and napalm. In the past such compositions have been prepared by dissolving agents such as aluminum naphthenate soaps or preformed high molecular weight hydrocarbon polymers such as polystyrene or rubber in gasoline or other hydrocarbons. These agents function as thickening agents and gel the hydrocarbon. A typical formulation of this nature might contain 10 parts by weight of aluminum naphthenate in 100 parts by weight of gasoline.

More recently a suitable napalm has been prepared by mixing a composition containing, by weight, 50% polystyrene, 25% benzene and 25% gasoline.

In large volume applications none of the above compositions are completely satisfactory. The amount of aluminum naphthenate available is limited by the availability of naphthenic acids derived from petroleum. The polystyrene compositions contain as much polystyrene as hydrocarbon, a situation which is only made tolerable by the exigencies of active combat since the price of polystyrene is normally about seven times higher than the price of gasoline. Furthermore, the preparation of these composeitions requires heating and mixing large amounts of highly combustible materials, which is a dangerous operation.

The process of this invention alleviates the abovementioned problems, and others, by making it possible to safely prepare thixotropic, gelled inflammable hydrocarbon compositions including hydrocarbon fuels and hydrocarbons for military uses from readily available inexpensive materials whose supply is not limited. One of the special features of the process of this invention is that the compositions can usually be prepared at ambient temperature without heating.

The novel compositions of this invention comprise a thixotropic, gelled hydrocarbon mixture containing a normally liquid mixture of hydrocarbons together with a high molecular weight polymer such as a cross-linked polyurethane. They are prepared by dissolving a semipolymer in a hydrocarbon or usually a mixture of hydrocarbons, and reacting the semipolymer under cross-linking conditions with a chain extending agent to form a final polymer which is cross-linked and of substantially higher molecular weight than the semipolymer, but not of sufficiently high molecular weight to precipitate from the hydrocarbon mixture. The semipolymer is a predominantly linear organic polymer which should be soluble in the hydrocarbon to be gelled and is characterized by the presence of at least two hydroxyl groups which are reactive with isocyanate groups on the chain extending agent. The molecular weight of the semipolymer may vary within wide limits and the preferred molecular weight will depend upon the particular hydrocarbon or hydrocarbon mixture to be gelled. Normally the molecular weight will be from about 1,000 to about 10,000.

While a number of difunctional and trifunctional semipolymers having the above cited characteristics are available for use in preparing the compositions of this invention, the preferred hydroxyl terminated semipolymers which are suitable for gelling substantially hydrocarbon mixtures are hydrocarbon semipolymers, especially polyalkylenes or polyalkylidenes containing repeating monomer units each containing up to ten or more carbon atoms. Especially preferred examples of these polymers are those derived from butadiene or butadiene and styrene. These are available from Sinclair Oil Company as Poly–BD–R–15M and Poly–CS–15. They are especially preferred because the allylic structure adjacent the hydroxyl groups considerably enhances the activity of these groups.

Polyhydroxylated polyethers and polyesters, containing at least two hydroxyl groups, of the class usually employed in the preparation of polyurethane elastomers and foams are also useful for the preparation of the thixotropic, gelled compositions of this invention. Polyethers are especially useful for the preparation of compositions of the invention from liquid hydrocarbon mixtures containing 40% or more by weight, based on the total weight, of aromatic hydrocarbons. Polyesters are especially suitable for hydrocarbon compositions containing 90% or more by weight of aromatic hydrocarbons. An especially preferred semipolymer of this class is the trifunctional polyether LG–56, available from Union Carbide Corporation. This semipolymer is a polypropylene ether triol with an average molecular weight of 3000 and an hydroxyl equivalent of 1000.

The chain extending polyisocyanate is preferably a diisocyanate or a triisocyanate. The former is preferred since diisocyanates are generally less expensive than triisocyanates. Of these, toluene diisocyanate, suitably the commercial mixture of toluene diisocyanate containing both the 2,4- and 2,6-isomers are especially preferred. Other suitable polyisocyanates which may be mentioned by way of example include 4,4′-diphenylmethane diisocyanate, hydrogenated 4,4′-diphenylmethane diisocyanate, lysine diisocyanate, polymethylene polyphenyl isocyanate and dimer acid diisocyanate.

As stated above the final polymers of this invention are cross-linked polyurethanes. They are three dimensional, high molecular weight polyurethanes having a molecular weight which is always substantially higher than that of the semipolymer, but not high enough so that the formed polyurethane is insoluble in the hydrocarbon. The molecular weight of the final polymer will vary appreciably with such factors as the molecular weight of the semipolymer and the amount and functionality of the chain extenders and cross-linking agents. Normally, it is at least 50,000, but it may be considerably higher.

The final polymer is prepared under cross-linking conditions. The term "cross-linking conditions" means that at least one of the reactants contains at least three functional groups so that three dimensional molecules will be formed. The preferred mode of operation is to use a trihydroxylated semipolymer and a difunctional isocyanate. However difunctional semipolymers and isocyanates can be employed in association with trifunctional cross-linking agents, especially trihydroxylated reactants. Suitable cross-linking agents which may be mentioned by way of example include glycerol, trimethylol ethane, trimethylol propane, 1,2,6-hexane triol, 1,2,4-butane triol, triethanol amine, diethylene diamine, sorbitol, methylated sucrose and castor oil. Cross-linking may also be effected utilizing difunctional semipolymers and trifunctional isocyanates. Alternatively a larger excess of diisocyanate may be employed in association with difunctional semipolymers. In this procedure the intermediate polymer between the semipolymer and the final polymer serves as the trifunctional cross-linking agent. The excess isocyanate reacts with the active hydrogen of the urethane link to cross-link two or more intermediate polymers by the formation of allophanate linkages.

The total amount of final polymer in the gelled compositions is generally from about 2% to about 20% by weight, based on the total weight of the compositions. It may however vary considerably from these limits with specific hydrocarbon mixtures, and final polymers and the desired degree of viscosity. With compositions of the invention intended for use as engine fuels, the total amount of final polymer in the composition rarely is above 15% by weight.

For the preparation of the preferred compositions of this invention, that is the compositions in which the hydrocarbon is gelled with polyurethanes, the reaction is carried out in the presence of catalysts of the class which have been found useful for catalyzing the low temperature reactions (about 65° F. to 110° F.) by which polyurethanes form adhesives, coatings and other polyurethane plastics. The catalysts are soluble in the hydrocarbon. Typical catalysts which may be employed as polyurethane forming catalysts include dibutyl tin dilaurate, tin octoate, ferric acetonyl acetonate, N-alkyl morpholine, triethylene diamine (DABCO), tertiary piperazine derivatives and the like. Metallic catalysts should be avoided in the preparation of engine fuels since they leave an ash which may seriously affect the efficiency of the engine.

For the preparation of inflammable compositions within the scope of this invention which are suitable for military use, the hydrocarbons employed are those normally utilized in the preparation of gelled inflammable hydrocarbon mixtures such as napalm-A and napalm-B. They are mixtures of aliphatic, aromatic and naphthenic hydrocarbons boiling from about 30° C. to about 360° C. under standard conditions. For fast acting incendiaries they are isolated from the gasoline fraction of petroleum crudes and boil at from about 30° C. to about 210° C. For delayed action incendiaries such as illustrated in Example 28 a heavier hydrocarbon cut of the same general nature, but boiling from about 250° C. to 360° C. under standard conditions will be employed. Preferably, although not necessarily, the selected hydrocarbon will contain aromatic compounds such as benzene, toluene, xylene, naphthalene, tetraline, hexaline and the like, to enhance their solvent capacity for the semipolymers. Such aromatic hydrocarbons may be added to the available mixtures if desired. Although hydrocarbon mixtures are preferred and are most practical, for special purposes it may be desirable to utilize a substantially pure hydrocarbon such as benzene.

For the preparation of the viscous compositions within the scope of this invention suitable for use as engine fuels the hydrocarbons employed are those normally utilized as fuels for internal combustion engines, jet engines and the like. They are mixtures of aliphatic, cycloaliphatic aromatic and naphthenic hydrocarbons boiling at from about 20° C. to 400° C. under standard conditions. Gasoline fractions boiling normally at from about 20° C. to 220° C. may be employed for the preparation of fuels for internal combustion engines. The kerosene fraction which normally boils at from about 100° C. to 300° C. may be employed in the preparation of fuel for jet and turbo-jet engines. Fractions boiling at from about 250° C. to 400° C. may be employed in the preparation of fuels for diesel engines. Any of these fractions may be enriched by the addition of lower boiling hydrocarbons as ignition aids. These may have the effect of appreciably lowering the boiling point of the defined fractions.

The hydrocarbon fuels of this invention may be brought to the section of the engine where they will be burned by any convenient means including the use of various injection devices or pumps. In the engine they function in substantially the same manner as the usual liquid fuels.

A particular feature of this invention is that the reaction to produce the gelled hydrocarbon can be carried out at any convenient time. For example, the semipolymer, chain extender and catalyst, if employed, may be prepared and shipped separately to the site of use, and there mixed with any hydrocarbon mixture which is available. Alternatively, selected hydrocarbon fractions can be prepared containing dissolved semipolymers and mixed with the chain extender at the site. In still another modification, all of the reactants can be mixed together just prior to addition to the hydrocarbon to be gelled. A further modification is to add all of the ingredients, except for a small fraction of the isocyanate, and to then add the last portion of isocyanate at the site where the hydrocarbon of increased viscosity is desired. For example, in the preparation of gelled hydrocarbons suitable for use as incindiaries utilizing LG-56 as the semipolymer, preferred compositions contain 1.5 parts by weight of toluene diisocyanate, 12.5 parts by weight LG-56 and 100 parts by weight gasoline, in addition to the other ingredients. Typical illustrations of the formulationn are shown in the examples. It may be convenient for various purposes to ship larger quantities of material ready to gel in large containers and then to shift the compositions to smaller containers for gellation. This procedure is especially useful for this purpose.

Another feature of this invention is that the reaction by which the viscosity of the hydrocarbon is increased may be stopped at any desired point by the addition of monofunctional chain stoppers. Ethanol and morphonile are especially useful for this purpose. This feature of the invention markedly increases the tolerances which are available to the technician preparing the compositions, for example, if the compositions are being prepared at the site of use, the viscosity can be checked from time to time and the reaction stopped when the desired viscosity has been attained. The reaction by which the compositions of this invention are prepared may take place over any convenient period from about 8 hours to 4 days or perhaps longer depending up the selected hydrocarbon fraction and the proportion and concentration of the reactants.

If convenient, the gelled compositions can be prepared at a central location and shipped in suitable containers ready for use. Depending upon such factors as composition, identity of reactants, activity of the catalyst and the relative amounts of the reactants and catalysts, the reaction will take place over a period of from about eight hours to four days, or even longer.

Although the compositions of this invention are particularly useful as incendiaries, they may also be employed in a wide variety of other uses. Properly packaged, they are useful to campers as heat sources. They are useful in the production of gelled jet fuels when the gelling agent, i.e. the final polymer, is fully combustible. They are especially valuable for this purpose because of the decreased danger of leakage compared with the usual jet fuels, which are highly flowable.

The compositions of this invention may be used as heat sources for campers and other outdoorsmen. For this purpose the compositions may be packaged in any suitable container. One especially convenient method of packaging is to package the compositions in squeeze tubes from which the desired quantity may be conveniently measured. Since highly viscous non-flowable gelly-like embodiments can be preparfed in accordance with the process of this invention, a fire may be prepared at any convenient location without danger of spreading.

A very convenient source of hydrocarbon mixtures suitable for use in this invention is ordinary commercial gasoline available from the usual commercial sources. These gasolines are generally available as "regular," "premium" or "high test." When LG–56 is used as the semipolymer, it is preferred to add varying amounts of aromatic hydrocarbons such as benzene, toluene or the like to increase the aromatic content of the mixture to about 40% by weight. A convenient rule of thumb is to untilize regular or premium gasoline with the aromatic hydrocarbon in the weight ratio of 80:20. With high test gasolines the ratio may be 95:5.

Since most commercial grades of gasoline contain small amounts of water, e.g. up to about 0.03% by weight, it is best to use sufficient polyisocyanate to react with the water to neutralize it.

The incendiary capacity of the compositions can be improved by the addition of from about 5% to about 2% by weight, based on the total weight of the composition, of high caloric and difficulty extinguishable metallic powders such as aluminum, zirconium, iron, sodium, lithium hydride, magnesium and the like.

Similarly, the combustibility and explosiveness of the compositions can be increased by the addition of about 5% to about 25% by weight, based on the total weight of the composition, of an oxidizer preferably in powder form, such as ammonium nitrate, ammonium perchlorate and mixtures of these compounds. It has been found that the mass remaining after evaporation of the hydrocarbon from the compositions of this invention, which contain such oxidizers, has excellent adhesive properties which permit it to be adhered to combustible surfaces and ignited with phosphorous incendiary rockets or bullets.

The following examples are given by way of illustration only, and should not be considered limitations of the invention, many apparent variations of which are possible without departing from the spirit or scope thereof.

All of the compositions described are highly inflammable and may be ignited, exploded or otherwise utilized in accordance with the standard procedures applicable to incendiaries, engine fuels and the like.

Example 1

Into 200 grams of benzene, 20 grams of a glycerol adduct of propylene oxide made by Union Carbide Corporation under the name of E–130 (hydroxyl No. —68.0 and acid No. —0.03) are mixed at ambient temperature to form a clear solution. Into this solution a mixture of 0.6 gram of triethylene diamine-(DABCO) made by Houndry Process and Chemical Company; 0.04 gram of tin octoate made under the trade name of T–9 by M & T Chemicals; 2.0 grams of N-ethyl morpholine was added. Finally, while mixing, 3.2 grams of toluene diisocyanate was introduced. The resulting clear mixture reached its highest thixotropic state of a clear light gelly-like fluid after about 24 hours.

Example 2

The procedure and composition in preparing this thixotropic hydrocarbon solution is the same as Example 1 with the exception that a mixture of 100 grams of benzene and of 100 grams of lead-free motor gasoline is used. The resulting product is a hazy thixotropic-gelly.

Example 3

The procedure and composition is the same as for Example 1 with the exception that only 100 grams of straight motor gasoline is used. A hazy thixotropic gell resulted.

Example 4

100 grams of regular motor gasoline and 100 grams of benzene mixed with 20 grams of an hydroxyl terminated poly-butadiene chain-semipolymer, of an average molecular weight of about 2,100 and an hydroxyl equivalent of 950. In the resulting clear mixture 1 gram of DABCO, 0.2 gram of T–9 (tin octoate) and 0.2 gram of triethanolamine are dissolved. Then finally 2.5 grams of toluene diisocyanate are added while mixing vigorously. After 24 hours, a slightly hazy gelled gasoline resulted.

Example 5

200 grams of regular motor gasoline are mixed with 20 grams of Poly–CS–15, which is an hydroxyl terminated copolymer of 25% styrene and 75% butadiene and has an average molecular weight of 2,100 and an hydroxyl equivalent of 950 (available from Sinclair Chemical Co.). To the resulting clear mixture a previously prepared solution of one gram of DABCO, 0.2 gram of T–9 and 0.2 gram of triethanolamine is added. To this prepared, storage stable composition, finally, when necessary 2.5 grams of toluene-diisocyanate are vigorously admixed. After standing for 24–36 hours this mixture containing almost 90 weight percent of standard regular motor gasoline is converted to a slightly hazy uniform, gelly-like, product.

Example 6

The procedure of this example is identical with the procedure of Example 2, but an additional 20 grams of fine aluminum powder is mixed with the original compounds to form a thixotropic composition containing dispersed aluminum powder.

Example 7

The procedure of this example is identical with the procedure of Example 2, but 25 grams of fine aluminum powder and 50 grams of powdery ammonium nitrate is incorporated into the original components to form a thixotropic composition containing dispersed aluminum powder and oxidizer.

Example 8

The procedure of this example is identical with the procedure of Example 3, but 15 grams of iron powder and 40 grams of ammonium nitrate are added to the original components to form a thixotropic composition containing dispersed iron powder and oxidizer.

Example 9

The procedure of this example is identical with the procedure of Example 4, but 10 grams of zirconium powder and 30 grams of ammonium nitrate are added to the original components to form a thixotropic composition containing dispersed iron powder and oxidizer.

Example 10

The procedure of this example is the same as the procedure of Example 5, but 5 grams of zirconium powder, 20 grams of aluminum powder, 25 grams of ammonium nitrate powder, and 10 grams of ammonium perchlorate powder are admixed with the original components to form a thixotropic composition containing dispersed metallic powders and oxidizers.

Example 11

100 grams of high test motor gasoline, from American Oil Company and 100 grams of technical benzene, are mixed with 30 grams of polyether triol E-130, one gram of triethylene diamine (DABCO 33-LV), 0.2 gram of dibutyl-tin-dilaurate and 4.8 grams of toluene diisocyanate. This clear mixture, after standing at about 65° F. for two-three days, becomes a clear, slightly tacky gell.

Example 12

200 grams of high-test motor gasoline from American Oil Company are mixed with a previously made solution consisting of 20 grams of Poly BD–R–CS–15, which is an —OH terminated copolymer of 25% styrene and 75% butadiene available from Sinclair Oil Company; 0.5 gram of triethylene diamine, 33% solution (DABCO 33–LV); and 0.2 gram of tin-oleate available from M & T Chemical Company under the trade name of T-9. This mixture is finally intimately reacted with 2.1 grams of toluene diisocyanate and left standing at about 65° F. for 3-4 days. A slightly hazy, uniformly gelled product results.

Example 13

75 grams of regular motor gasoline from American Oil Company and 25 grams of technical benzene are mixed with a previously prepared solution of 10 grams of Poly–BD–R–15M, which is an hydroxyl terminated polybutadiene having a molecular weight of about 2,100 and an hydroxyl equivalent of 1,056 made by Sinclair Oil Company; 0.5 gram of DABCO 33–LV and 0.15 gram of T–9. This mixture is reacted at about 65° F. with 1.1 grams of toluene diisocyanate and left standing at ambient temperature for 2–3 days. A uniform slightly hazy solid gell results.

Example 14

The procedure is the same as in Example 13, but instead of 10 grams of Poly–BD–R–15M, 10 grams of Poly–BD–CS–15 was used. After 3 days at about 70° F. a slightly hazy, gelly, semi-fluid product results.

Example 15

The procedure is the same as in Example 13, but instead of 0.15 gram of T–9, 0.15 gram of T–12, which is dibutyl-tin-dilaurate made by Union Carbide Corporation, was used. After 3 days at ambient temperature, a slightly hazy, pinkish, uniform solid gell results.

Example 16

The procedure is the same as in Example 12, but instead of 20 grams of Poly–BD–R–CS–15, 20 grams of Poly–BD–R–15M was used. After three days at ambient temperature, a slightly hazy, uniform, solid gell results.

Example 17

The procedure is the same as in Example 12, but instead of 0.2 gram of T–9, 0.2 gram of T–12 was used. After three days at ambient temperature, a uniform, slightly yellowish, movable gell results.

Example 18

100 grams of regular motor gasoline made by American Oil Company and 50 grams of technical benzene are mixed with a previously prepared composition consisting of 10 grams of Sinclair's Poly–BD–R–15M, 0.5 gram of DABCO 33–LV and 0.15 gram of T–9. This clear intersolution is finally mixed and reacted at ambient temperature with 1.1 grams of toluene diisocyanate. The product has a pot life of about 24 hours during which it can be poured or transferred into smaller containers. After an additional one to two days, it gells to a sticky, semi-fluid gelly product containing over 93 weight percent of the original 2:1 gas-benzene mixture.

Example 19

100 grams of a high-test motor gasoline made by American Oil Company is mixed with 100 grams of technical benzene. Into this mixture a previously prepared composition consisting of 20 grams of LG–56, 0.6 gram of DABCO, 0.04 gram of T–9 and 2.6 grams of toluene diisocyanate is added while vigorously mixing. This composition has at least a three days pot life. Afterwards it starts to gell and in 6 days it consists of a clear, uniform, slightly fluid gelly. LG–56 is a polypropylene ether triol with an average molecular weight of 3,000 and an hydroxyl equivalent of 1,000, available from Union Carbide Corp.

Example 20

100 grams of high test gasoline from American Oil Company, were mixed with a previously prepared composition of 10 grams of Sinclair's Poly–BD–R–15M, one gram of DABCO, 0.2 gram of T–9. The resulting mixture is finally cured with 1.7 grams of lysine diisocyanate. This composition has a pot life of only 8 hours after which it cures to slightly hazy, but uniform, movable gell.

Example 21

100 grams of the long chain polyether triol LG–56 is dissolved in 100 grams of benzene and into this solution 9.0 grams of toluene diisocyanate are admixed plus 0.5 gram of T–9 and 2.5 grams of DABCO. The resulting reaction product, which is a transparent solid gelly, is ground to small pieces and vigorously mixed with 500 grams of high-test motor gasoline. A slowly flowable gelly results.

Example 22

100 grams of high-test motor gasoline made by American Oil Company were mixed with 10 grams of a high molecular adduct of propylene oxide and trimethylol propane available from Wyandotte Chemical Corporation under the trade name of TP–4040, having a molecular weight of about 3,040 and an hydroxyl equivalent weight of 1,010. To this clear mixture, 0.5 gram of DABCO and 0.1 gram of T–12 were admixed and finally reacted with 1.0 gram of toluene diisocyanate. The clear composition, after standing six days, became water-white, clear thixotropic gelly. When using increased quantities of the catalysts, such as 1.0 gram of DABCO and 0.15 gram of T–9 for the same amount of TP–4040, the gelling required only 3 days. The resulting gell was more firm. This example shows that by varying the amount of the catalyst(s) it is possible to accelerate the gelling rate.

Example 23

100 grams of high-test motor gasoline from American Oil Company were mixed with 10 grams of Poly–BD–R–15M, one gram of DABCO and 0.2 gram of T–12. This clear mixture was reacted with 1.5 grams of a fully hydrogenated methylene diphenyl diisocyanate (MD1) available from Allied Chemical Corporation under the code designation H–12–MD1 having an —NCO equivalent weight of 131 and a M.P. of about 60° C. The resulting mixture has a pot life of only 10 hours. Afterwards it starts to gell and in 24 hours it gives a firm, uniform gelly.

Example 24

150 grams of regular motor gasoline from American Oil Company were premixed with 50 grams of technical toluene; together with 200 grams of motor fuel. Into this mixture 10 grams of Sinclair's Poly–BD–R–15M, 0.75 gram of DABCO, and 0.15 gram of T–9 were admixed. Finally, 1.2 grams of toluene diisocyanate were introduced while mixing for a few minutes. The resulting low viscosity liquid containing over 94 weight percent of pure motor fuel and only less than 6 weight percent of other combustible resinous material, after three days of standing, became a slightly hazy, pinkish, uniform touch-dry gelly.

This formulation was repeated, using 150 pounds of regular motor gasoline, 10 pounds of Sinclair's Poly–BD–R–15M and 2.5 ounces of T–9. Separately, in 50 pounds of technical toluene, 4 ounces of pure 100% triethylene diamine (DABCO) were dissolved. These two motor fuel solutions were mixed together with 1.2 pounds of toluene diisocyanate. The resulting composition, in three days, gelled to a uniform, hazy, pinkish, touch-dry gelly.

Example 25

200 pounds of high-test motor gasoline were premixed with 10 pounds of Sinclair's Poly–BD–R–15M and 4 ounces of pure 100% triethylenediamine (pure powdery DABCO). To this solution 3 ounces of T–12 and 1.2 pounds of toluene diisocyanate were well mixed. After standing for three days at ambient temperature, this gasoline became a slightly hazy, uniform, movable gelly.

Example 26

In 150 pounds of regular motor gasoline, which was provided by the American Oil Company, 10 pounds of Sinclair's Poly–BD–R–15M, 4 ounces of 100% triethylenediamine (pure DABCO) 4 ounces of iron acetylacetonate (FeAA) made by Aceto Chemical Company, Inc., were successively dissolved. This solution was mixed with 1.2 pounds of toluene diisocyanate. After standing at ambient temperature for 24 hours, it gelled to a firm, red gelly.

Example 27

In 150 pounds of regular motor gasoline provided by American Oil Company, 5 pounds of Sinclair's Poly–BD–R–15M, 10 pounds of Wyandotte's triol TP–4040, 0.2 pound of 100% triethylene diamine (pure DABCO) and 0.2 pound of iron acetyl-acetonate (FeAA) were successively dissolved. This clear solution was mixed with 1.6 pounds of toluene diisocyanate. After standing for 24 to 36 hours a red transparent gel results.

Example 28

90 grams of light mineral oil and 10 grams of Sinclair's Poly–BD–R–15M, 5 grams of toluene diisocyanate, 0.2 gram of FeAA and 0.2 gram of pure DABCO were mixed at ambient temperature. After standing for 24 hours soft rubbery material results.

Example 29

A total of 200 pounds of JP–4 jet fuel (a kerosene based fuel containing a small quantity of light hydrocarbons for easier ignition), 10 pounds of Poly–BD–R–15M, 1.5 pounds of toluene diisocyanate and 0.25 pound of triethylene diamine are mixed at about 65° F. After standing for 48 hours a viscous, thixotropic composition suitable for use as a jet fuel forms. This jet fuel due to its greatly increased viscosity and tacky consistency does not leak out of broken containers and when ignited does not burn violently and explode as is the case with the usual jet fuels.

It should be noted in this example that there are no metallic ingredients so that the jet fuel will burn without leaving an ash.

A special feature of this invention is that the gelling reaction can be stopped at any desirable point to prepare gels of any desired viscosity. This can be accomplished by the addition of various monofunctional chain stoppers which are soluble in the liquid hydrocarbon. Morpholine and ethanol are particularly useful. This embodiment of the invention is illustrated in Example 30.

Example 30

A total of 100 pounds of JP–4 jet fuel, 10 pounds of Poly–BD–R–15M, 0.25 pound of triethylene diamine and 1.2 pounds of toluene diisocyanate are mixed at about 65° F. At the end of one hour the viscosity of the mixture reaches a value of about 5,000 centipoises and at the end of 12 hours the composition becomes a solid gel.

When the above reaction procedure is modified by the addition of 0.2 gram of absolute ethyl alcohol at the end of the first hour, no further increase in viscosity takes place.

Example 31

A total of 200 grams of a gasoline boiling in the boiling range 38° C. to 204° C. with an average molecular weight of 114 and a viscosity of about 5, 10 grams of Poly–BD–R–15M which is an hydroxyl terminated polybutadiene having a molecular weight of about 2,100 and an hydroxyl equivalent of 950 made by Sinclair Oil Company, 1.2 grams of toluene diisocyanate and 0.3 gram of triethylene diamine are mixed at about 65° F. and left standing for two days during which period the viscosity increases about 10,000 percent.

Example 32

A total of 200 grams of regular motor gasoline having a viscosity of about 5, 25 grams of Poly–CS–15 which is an hydroxyl terminated copolymer of 25% styrene and 75% butadiene having an average molecular weight of 2,100 and an hydroxyl equivalent of 950 (available from Sinclair Chemical Co.), 1.4 grams of lysine diisocyanate and 0.5 gram of N,N'-dimethyl piperazine is mixed and allowed to stand for three days during which period the mixture is converted to a viscous gelly-like composition.

Example 33

A total of 100 pounds of JP–4 jet fuel, 10 pounds of Poly–BD–R–15M, 0.25 pound of triethylene diamine and 1.2 pounds of toluene diisocyanate are mixed at about 65° F. At the end of one hour the viscosity of the mixture reaches a value of about 5,000 centipoises and at the end of 12 hours the composition becomes a solid gel.

When the above reaction procedure is modified by the addition of 0.2 gram of absolute ethyl alcohol at the end of the first hour, no further increase in viscosity takes place.

Example 34

A total of 200 grams of diesel fuel boiling at 265° C.–323° C. with an average molecular weight of 220 and a viscosity of about 30 centipoises, 10 grams of a glycerol adduct of propylene oxide made by Union Carbide Corporation under the name of E-130 (hydroxyl number 68.0; acid number 0.03), 0.25 gram of pure triethylene diamine and 0.2 gram of dibutyl tin dilaurate are mixed at 75° F. and allowed to stand for two days during which period the mixture increases considerably in viscosity and becomes a thixotropic gelly-like composition.

Examples 35–59

The following compositions in which the amounts of all of the ingredients are given in parts by weight are mixed to give gelled compositions, all of which are completely gelled within 72 hours. All of the ingredients identified by code name or trademark have been identified above. These examples show the preparation of gelled hydrocarbon compositions using commercial grades of gasoline. The gasolines are identified by company, grade and in some cases by the trademark. In the examples H.T. refers to high test and Reg. to regular grades of gasoline. TDI is the commercial grade of toluene diisocyanate comprising an 80:20 mixture of 2,4- and 2,6-toluene diisocyanate.

Compositions

No. 35:
 200.0 H.T. gas—American
 25.0 LG–56
 0.2 T–12
 0.25 DABCO (dry fine)
 2.5 TDI No. 36:
 200.0 H.T. gas—American
 24.0 LG–56
 0.2 T–12
 0.25 DABCO (dry fine)
 2.4 TDI No. 37:
 200.0 H.T. gas—American
 26.0 LG–56
 0.2 T–12
 0.25 DABCO (dry fine)
 2.6 TDI No. 38:
 180.0 H.T. gas—American
 25.0 LG–56
 0.2 T–12
 1.25 DABCO (benzene)
 3.0 TDI
 20.0 toluene No. 39:
 160.0 Reg. gas—American
 40.0 toluene
 25.0 LG–56
 0.2 T–12
 1.25 DABCO (benzene)
 2.0 TDI No. 40:
 160.0 Reg. gas—Sinclair
 40.0 toluene
 25.0 LG–56
 0.2 T–12
 1.25 DABCO (benzene)
 3.0 TDI No. 41:
 190.0 H.T. gas—Sinclair
 10.0 toluene
 25.0 LG–56
 0.2 T–12
 1.25 DABCO (benzene)
 2.0 TDI No. 42:
 160.0 Reg. gas—Sunoco–190
 40.0 toluene
 25.0 LG–56
 0.2 T–12
 1.25 DABCO (benzene)
 3.0 TDI No. 43:
 160.0 Gulftane—Reg.
 40.0 toluene
 25.0 LG–56
 0.2 T–12
 1.25 DABCO (benzene)
 3.0 TDI No. 44:
 190.0 Gulf No-Nox—Gas H.T.
 10.0 toluene
 25.0 LG–56
 0.2 T–12
 1.25 DABCO (benzene)
 3.0 TDI No. 45:
 160.0 Esso—Reg.
 40.0 toluene
 25.0 LG–56
 0.2 T–12
 1.25 DABCO (benzene)
 3.0 TDI No. 46:
 160.0 Mobil—Reg.
 40.0 toluene
 25.0 LG–56
 0.2 T–12
 1.25 DABCO (benzene)
 3.0 TDI No. 47:
 190.0 Mobil—H.T.
 10.0 toluene
 25.0 LG–56
 0.2 T–12
 1.25 DABCO (benzene)
 3.0 TDI No. 48:
 160.0 Texaco-Fire Chief—Reg.
 40.0 toluene
 25.0 LG–56
 0.2 T–12
 1.25 DABCO (benzene)
 3.0 TDI No. 49:
 190.0 Texaco-Sky Chief—H.T.
 10.0 toluene
 25.0 LG–56
 0.2 T–12
 1.25 DABCO (benzene)
 3.0 TDI No. 50:
 160.0 Atlantic—Reg.
 40.0 toluene
 25.0 LG–56
 0.2 T–12
 1.25 DABCO (benzene)
 3.0 TDI No. 51:
 160.0 Sunoco 260—H.T. gas
 40.0 toluene
 25.0 LG–56
 0.2 T–12
 1.25 DABCO (benzene)
 2.0 TDI No. 52:
 160.0 Gulf No-Nox—H.T.
 40.0 toluene
 25.0 LG–56
 0.2 T–12
 1.25 DABCO (benzene)
 2.0 TDI No. 53:
 160.0 Esso-Extra—H.T.
 40.0 toluene
 25.0 LG–56
 0.2 T–12
 1.25 DABCO (benzene)
 3.0 TDI No. 54:
 160.0 Atlantic-Imperial—H.T.
 40.0 toluene
 25.0 LG–56
 0.2 T–12
 1.25 DABCO (benzene)
 2.0 TDI No. 55:
 160.0 Crown-Silver—Reg.
 40.0 toluene 25.0 LG-56
0.2 T-12
1.25 DABCO (benzene)
2.0 TDI No. 56:
  160.0 Chevron—Reg.
  40.0 toluene
  25.0 LG-56
  0.2 T-12
  1.25 DABCO (benzene)
  3.0 TDI No. 57:
  160.0 Chevron—H.T.
  40.0 toluene
  25.0 LG-56
  0.2 T-12
  1.25 DABCO (benzene)
  3.0 TDI No. 58:
  160.0 Flying A—Reg., Mobil
  40.0 toluene
  25.0 LG-56
  0.2 T-12
  1.25 DABCO (benzene)
  2.0 TDI No. 59:
  160.0 Flying A—H.T., Mobil
  40.0 toluene
  25.0 LG-56
  0.2 T-12
  1.25 DABCO (benzene)
  3.0 TDI Example 60

A blend containing the following ingredients in the parts by weight indicated is prepared.

| | |
|---|---:|
| Regular gasoline | 80,000 |
| Toluene | 20,000 |
| LG-56 | 12,500 |
| T-12 | 100 |
| Dabco as 20% benzene solution | 625 |
| Toluene diisocyanate | 1,000 |

The mixture is held for one month with no gel formation. There is only a slight increase in viscosity. At the end of the month the composition is divided into ten parts and sufficient toluene diisocyanate added to each one to increase its diisocyanate content to 1.5% by weight. Each of the compositions is held at ambient temperature for 72 hours during which period a thixotropic gel composition forms.

What is claimed is:

1. A method for substantially increasing the viscosity of a normally liquid hydrocarbon fuel to produce a thixotropic gelled composition which comprises reacting, in said liquid hydrocarbon, a semipolymer which is soluble therein, has a molecular weight of at least one thousand and is selected from the group consisting of polyalkylenes, polyalkylidenes, polyethers and polyesters containing at least two hydroxyl groups with a polyisocyanate under cross-linking conditions to produce a cross-linked polyurethane which has a molecular weight substantially higher than the molecular weight of said semipolymer and does not precipitate.

2. A process as in claim 1 in which the semipolymer has a molecular weight of from about 1000 to 10,000 and polyurethane has a molecular weight of at least 50,000.

3. A process as in claim 1 in which the normally liquid hydrocarbon fuel is selected from the group consisting of gasoline, kerosene and diesel fuel.

4. A process as in claim 1 in which the semipolymer is a long chain hydrocarbon polymer in which the terminal hydroxyl groups are allylic.

5. A process as in claim 1 in which the semipolymer is a polyether polymer and the hydrocarbon contains at least 40% by weight of aromatic components.

6. A process as in claim 1 in which the semipolymer is a polyester polymer and the hydrocarbon contains at least 90% by weight of aromatic components.

7. A process as in claim 1 in which reaction is effected in the presence of from about 5% to about 20% by weight, based on the total weight of the gelled composition, of at least one high caloric, difficultly extinguishable metallic powder selected from the group consisting of aluminum, zirconium, iron, sodium, lithium hydride and magnesium.

8. A process as in claim 1 in which reaction is effected in the presence of from about 5% to about 25% by weight, based on the total weight of the composition of an oxidizer selected from the group consisting of ammonium nitrate, ammonium perchlorate and mixtures thereof.

9. A process as in claim 1 in which cross-linking is effected by reacting a difunctional semipolymer with excess polyisocyanate.

10. A process as in claim 1 in which cross-linking is effected by carrying out the reaction between a difunctional semipolymer and a diisocyanate in the presence of a cross-linking reagent having three functional groups which are reactive with the diisocyanate.

11. A process as in claim 1 in which cross-linking is effected by reacting a difunctional semipolymer with a triisocyanate.

12. A process as in claim 1 in which cross-linking is effected by reacting a trifunctional semipolymer with a diisocyanate.

13. A process as in claim 12 in which the diisocyanate is toluene diisocyanate.

14. A thixotropic, gelled, inflammable hydrocarbon composition having dissolved therein from about 2% to about 20% by weight, based on the total weight, of a high molecular weight cross-linked polyurethane prepared in accordance with the process of claim 1.

15. A composition as in claim 14 containing from about 5% to about 20% by weight, based on the total weight, of at least one high caloric, difficultly extinguishable metallic powder selected from the group consisting of aluminum, zirconium, iron sodium, lithium hydride and magnesium.

16. A composition as in claim 14 containing from about 5% to about 25% by weight, based on the total weight, of an oxidizer selected from the group consisting of ammonium nitrate, ammonium perchlorate and mixtures thereof.

References Cited

UNITED STATES PATENTS

| | | | |
|---|---|---|---|
| 3,119,792 | 1/1964 | Schultheis et al. | 260—2.5 |
| 3,236,811 | 2/1966 | Ellegast et al. | 260—75 |
| 3,291,660 | 12/1966 | Oberth et al. | 149—19 |
| 3,355,269 | 11/1967 | Winkler | 44—7 |

DANIEL E. WYMAN, Primary Examiner

C. F. DEES, Assistant Examiner